United States Patent Office 3,251,355
Patented May 17, 1966

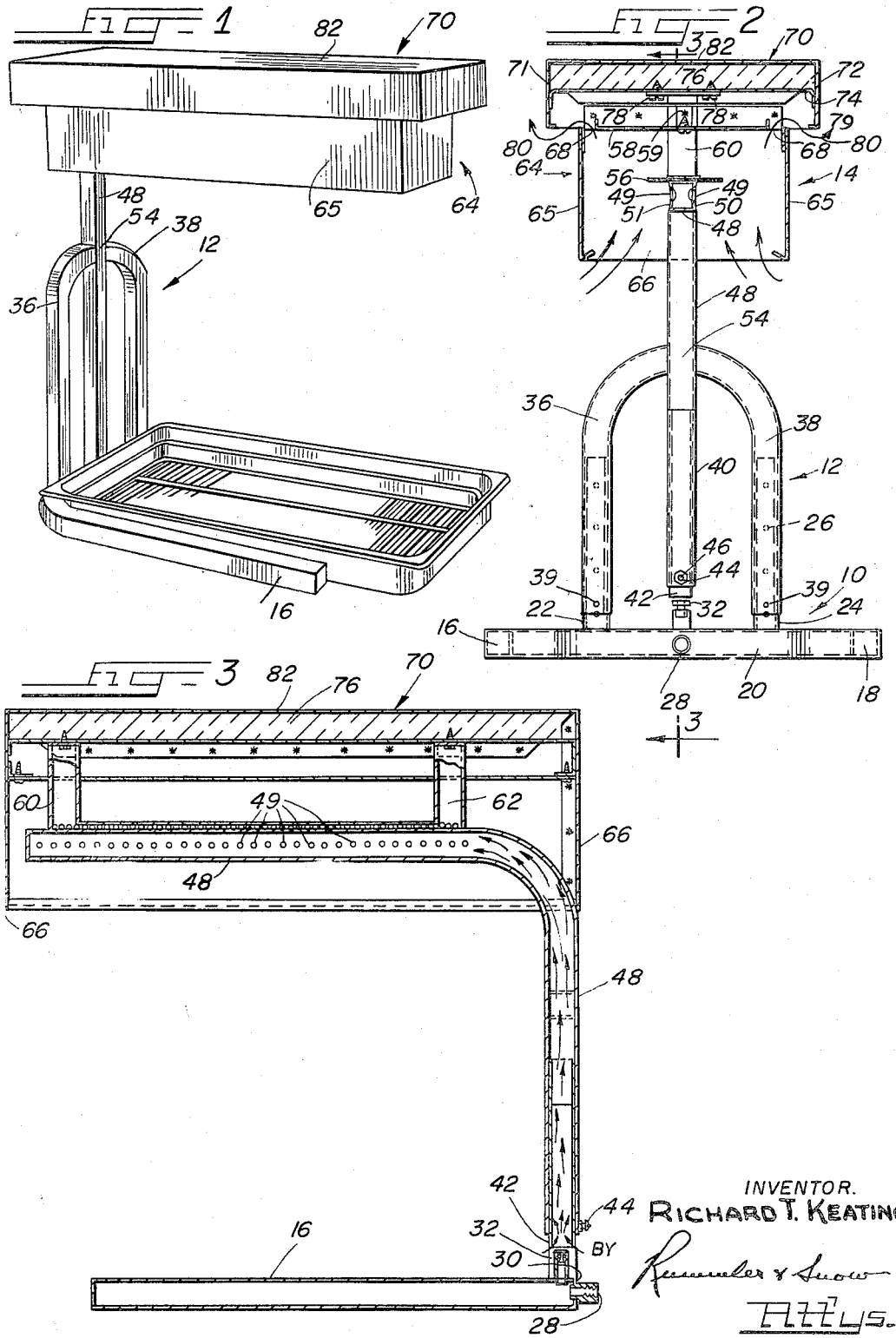

3,251,355
GAS FIRED INFRARED FOOD WARMER
Richard T. Keating, 144 N. Cuyler Ave., Oak Park, Ill.
Filed Sept. 16, 1964, Ser. No. 396,820
5 Claims. (Cl. 126—40)

This invention relates to a gas fired infrared food warmer and more particularly to a stand for supporting the radiating head of the warmer that also serves as the conduit for the gas to the burner.

Infrared radiation for broiling food has found wide usage due to its many distinct advantages including its characteristics similar to the characteristics of the waves of the visible light spectrum. For example, they do not heat the air through which they travel and they can be reflected and directed to the area of desired heating. They also have the advantages of being emitted from any warm body with the rate of emission dependent upon the temperature of the source such that the warmer the source the greater the amount of infrared waves it will emit.

A common method of generating infrared waves in an infrared food broiler is through the use of a gas fired burner heating a wire mesh screen to incandescence and reflecting and concentrating the waves emitted by the screen to the desired area to be heated.

In such infrared food cooking devices it is possible to control the heat reaching the heated area by one or both of two methods. One method, as previously mentioned, being to control the temperature of the screen by controlling the heat supplied to the screen, and the other method being to adjust the distance between the screen and the area to be heated as the intensity of the infrared waves, like light waves, decreases with an increase in distance traveled.

The present invention concerns gas fired burners radiating infrared waves for heating food which devices may be used in the larger kitchens such as kitchens of institutions or restaurants where the cooking facilities must be kept available to prepare food but the food that is already prepared must be kept warm until served. The aforementioned characteristics and advantages of infrared waves are ideally suited to employ them in table-top mounted infrared food warmers for keeping relativley large quantities of prepared food ready for immediate serving.

As the infrared food warmers will be mainly used in the kitchens of institutions and restaurants, it is desirable to have an infrared food warmer whose simplicity in design and operation would lend itself to the function of an efficient kitchen while providing a means of easy manual adjustment to control the radiated heat for keeping food at a desired temperature.

It is therefore an object of this invention to provide a simple, self-supporting, gas fired infrared food warmer of the above characteristics with a light-weight supporting frame that allows for complete mobility and convenient placement and has a means for adjusting the heat reaching the heated area through the use of either or both of the before mentioned methods of heat control.

It is a further object of this invention to provide a light-weight portable food warmer whose supporting frame is also a transporting conduit for the gas of the gas-fired burner, and whose gas-fired burner is also an integral part of the supporting frame.

It is a still further object of the present invention to provide a portable gas-fired infrared food warmer having a sturdy supporting frame and base; whose base does not interfere with the heated area and can serve as a support for the containers of the food to be kept warm; and whose whole construction will permit positioning of many such warmers side by side, when it is necessary to use more than one, without interference or wasted space.

It is another object of this invention to provide a supporting frame for the gas-fired burner than can be easily adjusted to the desired height for regulating the heat applied to the food to be kept warm and to compensate for food of different heights to be placed in the heating area.

Further objects and advantages will become apparent as reference is made to the following accompanying figures in which:

FIGURE 1 is a perspective view of a gas-fired infrared food warmer according to my invention;

FIG. 2 is an end view, partly in section, showing the burner and radiating elements of the improved food warmer, and FIG. 3 is a sectional view, as taken on the lines 3—3 of FIG. 2.

Referring first to FIG. 1 it is seen that the invention is comprised of three main parts, namely the base frame 10, the burner frame 12, and the radiating head 14.

The base frame 10 is comprised of a light metal tube of rectangular cross section bent in the shape of a U thereby having arms 16 and 18 extending horizontally past the projected center of gravity of the device and interconnected at an end by a cross member 20 which forms the base of the U-shape. Extending vertically from the top surface of the cross member 20 and solidly attached thereto are two identical legs 22 and 24 of light weight tubular material, such as steel, having multiple apertures 26 spaced at predetermined distances along their length.

A gas supply inlet 28 extends horizontally from the mid-portion of the rear wall 30 of the cross member 20 and an outlet nozzle 32 extends vertically from the top surface of the cross member 20 directly above the gas inlet 28.

The burner frame 12 is also comprised of light weight metal tubes of rectangular cross section. As shown, the burner frame is arranged so as to resemble a three-tined fork or trident with the handle of the fork bent at a right angle to the plane of the tines, and the tines extending in a downward direction. The two outer tines are the legs 36 and 38 of the burner frame and are disposed directly in line with the legs 22 and 24 of the base frame 10 but are larger in section so as to slidably engage the legs 22 and 24 in a telescoping manner. The burner legs 36 and 38 each has an aperture 39 adjacent its lower end which is located for matching alignment with any one of the multiple apertures 26 in the respective one of the legs 22 and 24.

By aligning the apertures 39 of the burner legs 36 and 38 with any of the various apertures 26 of the legs 22 and 24 of the base frame 10, as by sliding the burner legs 36 and 38 in the telescoping manner, and then placing suitable holding pins through the aligned apertures, the burner frame can be positioned at any of the various heights limited only by the length of the legs 22 and 24 of the base frame 10.

Another tube 40, centrally located between the burner legs 36 and 38, extends downward from the juncture 54 of the legs 36 and 38 and in the same plane as the said legs. The center tube 40 has a threaded aperture 46 in one wall at its lower end which threadably receives a set screw or wing screw 44. As shown, the center tube 40 slidably engages a smaller tube or mixing chamber 42 in a telescoping manner. The tube 42 is positioned directly above the gas outlet 32 on the base frame 10 and can be raised or lowered relative to the gas outlet 32 to permit adjustment of the gas and air mixture for maximum combustion. The mixing chamber 42 is held in its desired position within the center tube 40 by a holding pressure of the set screw 44 acting against the wall of the mixing chamber 42.

Extending vertically a short distance from the juncture 54 of the burner legs 36 and 38 and the central tube 40, then bent horizontally at a right angle to the plane of the legs and in the same direction and parallel to the extending arms 16 and 18 of the base frame 10, is the burner and radiating head supporting tube 48. The horizontal portion of the burner and supporting tube 48 has multiple apertures 49 spaced at predetermined distances in its side walls 50 and 51. The gas and air mixture from the mixing chamber 42 flows through the central tube 40 which directs it into the burner and supporting tube 48 where it escapes through the apertures 49 and is ignited to produce a row of horizontally extending flames extending from both walls 50 and 51 of the burner tube.

Referring now to FIGS. 2 and 3, it is seen that the burner tube 48 has the further purpose of supporting the screen 56 and the radiating head 14 of the gas burner. The wire mesh screen 56 is attached directly on the top surface of the burner tube 48 and extends a sufficient length so as to be above all the apertures 49 in the walls 50 and 51 of the tube 48. The width of the screen 56 is made sufficient to cover the extending flames and to prevent the flame from curling over the edge of the screen.

A polished reflector 58 is mounted above the screen 56 so as to direct the upward radiations of the screen 56 to the heating area at the base of the apparatus. This reflector is supported in the radiating head 14 by means of clips 59 in spaced relationship with respect to the screen and the radiating head is in turn supported from the burner tube by T-shaped spacing attachments 60 and 62. The reflector 58 extends the length of the radiating head in order to receive the upward directed infrared waves from the screen 56 and reflect them downwardly to the heating area.

In the form shown the radiating head 14 comprises a box-like enclosure 64 having side and end walls 65 and 66, respectively, and being open at its top and bottom. The reflector 58 extends from end to end of the enclosure 64, generally in the plane of the top opening, but is of less width than the enclosure so as to leave an open space 68 at each side for the escape of the products of combustion produced by the burner tube 48. The end walls 66 of the enclosure 64 extend upwardly beyond the side walls thereof and conneect directly to the ends of a rectangular cover member 70 which is of greater width than the enclosure 64 and has depending side walls 71 and 72. The cover member 70 has an inner wall 74, spaced from and parallel with its top to provide an enclosure for heat insulating material 76 and the entire assembly of cover member 70, enclosure 64 and reflector 58, is supported from the burner tube 48 by the attaching means 60 and 62 which connect with the inner wall 74 by suitable fasteners such as the screws 78. As shown, the side walls 71 and 72 of the cover member extend downwardly to about the plane of the reflector 58 and, being spaced outwardly from the walls 65–66 of the enclosure 64, provide open passages 79 for escape of gases as indicated by the arows 80. Also the clips 59, supporting the reflector 58, are attached directly to the enclosure end walls 65.

The flat top surface 82 of the radiating head cover member 72 also provides an area on which dishes can be placed to be heated or kept warm. This heating surface is present because some of the heat from the products of combustion, escaping past the edges of the reflector 58 will pass through the insulation 76, thereby heating the top surface 82.

Although but one specific embodiment of this invention has been herein shown and described it will be understood that details of the construction shown may be altered or omitted without departing from the spirit of the invention as defined by the following claims.

I claim:
1. A food warmer comprising an upright stand having
 (1) a horizontal base with
  (a) a pair of legs extending upwardly therefrom and interconnected at their top, and
  (b) a gas supply outlet extending upwardly to discharge gas vertically between said legs,
 (2) a tubular support extending from the interconnected legs and having a horizontal portion extending over the base, said portion having
  (a) longitudinally spaced apertures in the side walls thereof, and
  (b) a wire screen and reflector mounted above said apertures, and
 (3) a tubular gas and air mixing chamber leading into and extending downward from the tubular support at the interconnected legs and terminating directly over the gas supply outlet for guiding a gas and air mixture to the tubular support where it may be ignited as it escapes through the apertures of the said support.

2. An infrared food warmer having a tubular metal stand and a downwardly directed infrared radiating head supported thereby and comprising
 (A) a U shaped base having
  (1) the arms of the U extending past the projected center of gravity of the radiating head for providing a sturdy three point support;
  (2) laterally spaced legs extending vertically from the base and interconnected at a predetermined height, and
  (3) a gas supply inlet and an outlet disposed between said legs for directing the gas vertically from the base,
 (B) a tubular support extending horizontally from the interconnected legs over the arms of the base, said support having
  (1) a plurality of longitudinally spaced laterally directed apertures in the side walls,
  (2) a wire screen extending lengthwise of the support above said apertures, and
  (3) a reflector mounted above said screen and directed downwardly toward said base, and
 (C) a metal tube communicating with said support and extending downwardly from the interconnected legs in axial alignment with the gas outlet, said tube having
  (1) a second tube telescopingly mounted thereon and opening toward said gas outlet, and
  (2) means for adjusting the position of said second tube on the first mentioned tube to vary the relation of the second tube and the gas outlet and control the mixture of gas and air entering said second tube.

3. A gas-fired infrared food warmer comprising a lightweight tubular metal frame having
 (1) a horizontally disposed U shaped base with
  (a) a pair of upstanding vertical legs attached to the base, each of said legs having a longitudinally extending series of apertures in a wall thereof, and
  (b) a gas supply inlet and an outlet on the base for directing the gas vertically between said legs,
 (2) a burner tube extending horizontally over the base and being terminated at one end by a pair of laterally spaced depending hollow elements fitting slidably over the vertical legs of the said base,
  (a) each of said elements having an aperture adjacent its lower extremity disposed to register with the apertures of the vertical legs and provide a means for height adjustment of the burner tube above the base, and means for securing the adjusted position of said elements on said legs,
  (b) a hollow depending tube leading from the burner tube intermediate the said elements and opening directly above the gas supply outlet, (c) a smaller tube slidably engaged within the said depending tube and adjustable axially thereof toward and away from said gas supply outlet for controlling the gas and air mixture entering said depending tube, (d) said burner tube having gas emitting apertures in the side walls thereof, and (3) a wire screen disposed above the burner tube to be heated by burning gas emitted from the burner tube apertures, and a reflector mounted above said screen for directing heat rays from said screen downwardly toward said base.

4. A gas-fired infrared food warmer having a tubular metal stand and a horizontally disposed downwardly directed infrared radiating head and comprising (A) a U shaped base with
  (1) the arms of the U extending horizontally past the vertically projected center of gravity of the radiating head, for providing a sturdy three point support,
  (2) a pair of legs extending vertically from said base, and
  (3) a gas supply inlet and an outlet for directing the gas vertically upward from the base;

(B) a burner tube and support having
  (1) three parallel laterally spaced vertically depending tubes branching from one vertical tube with said one vertical tube terminated by a right angle bend forming a horizontal tube extending over the base parallel with the arms thereof,
    (a) the two outermost vertical tubes slidably telescoping with the vertical legs of the base,
    (b) means for securing said vertical tubes at selected positions of telescoping adjustment on said vertical legs,
    (c) the middle vertically depending tube having a telescopingly slidable tubular extension at its lower end disposed directly above the vertically directed gas outlet of the base, said extension being adjustable toward and away from said gas outlet for regulating the air and gas mixture entering said middle depending tube, and
    (d) the said horizontal tube having direct communication with said middle tube and having a row of apertures in the side walls thereof for emitting the gas and air mixture for combustion, and said horizontal tube directly supporting the radiating head to be heated thereby.

5. A gas-fired infrared food warmer comprising a tubular metal frame having (1) a horizontally disposed U shaped base with
  (a) a pair of laterally spaced legs attached thereto and extending vertically therefrom, and
  (b) a gas supply inlet and outlet at the rearward end of the base for discharging gas vertically between said legs;

(2) a hollow burner tube extending horizontally over the base and having a right angle bend at its rearward end directed downwardly toward the base and branching into three parallel laterally spaced depending hollow tubes,
  (a) the two outermost tubes being disposed and formed to fit slidably over the vertical legs of the base, and
  (b) the center tube leading directly from said burner tube and being aligned with the vertical gas outlet and having a telescopingly adjustable tubular extension opening toward the said gas outlet on the base for controlling the gas and air mixture entering said center tube to be supplied to the burner tube, and
  (c) the horizontal portion of said burner tube having a series of longitudinally spaced apertures in the opposite side walls thereof and supporting a wire screen overhanging the apertured side walls of the tube and a reflector spatially mounted above said screen for directing heat rays from the screen downwardly toward said base; and (3) means for securing the said depending outermost tubes at selected positions of telescopic adjustment on the vertical legs of said base for adjusting the height of the burner tube above said base.

References Cited by the Examiner

UNITED STATES PATENTS

| | | | |
|---|---|---|---|
| 457,153 | 8/1891 | Friedburg | 126—40 |
| 494,470 | 3/1893 | Edwards | 126—40 |
| 2,582,642 | 1/1952 | Mayer | 126—41 X |
| 2,832,331 | 4/1958 | Schwank | 126—40 X |

FOREIGN PATENTS

| | | |
|---|---|---|
| 609,406 | 9/1948 | Great Britain. |
| 623,850 | 5/1949 | Great Britain. |

CHARLES J. MYHRE, *Primary Examiner.*